United States Patent
Udono et al.

(10) Patent No.: US 7,617,673 B2
(45) Date of Patent: Nov. 17, 2009

(54) CONTROLLER FOR INTERNAL COMBUSTION ENGINE

(75) Inventors: Tadatsugu Udono, Mino (JP); Takashi Okada, Hitachinaka (JP); Minoru Ohsuga, Hitachinaka (JP); Eiichi Ohtsu, Mito (JP)

(73) Assignee: Hitachi, Ltd., Tokyo (JP)

( * ) Notice: Subject to any disclaimer, the term of this patent is extended or adjusted under 35 U.S.C. 154(b) by 360 days.

(21) Appl. No.: 11/492,061

(22) Filed: Jul. 25, 2006

(65) Prior Publication Data

US 2007/0107416 A1 May 17, 2007

(30) Foreign Application Priority Data

Jul. 25, 2005 (JP) ............................. 2005-214571

(51) Int. Cl.
*F01N 3/00* (2006.01)
(52) U.S. Cl. ............................. 60/285; 60/280; 60/284; 60/286; 180/65.2; 180/65.3; 180/65.4
(58) Field of Classification Search .................. 60/274, 60/280, 284, 285, 299, 300, 286; 180/65.2, 180/65.3, 65.4
See application file for complete search history.

(56) References Cited

U.S. PATENT DOCUMENTS

| | | | | |
|---|---|---|---|---|
| 5,327,991 | A * | 7/1994 | Yoshida | 180/65.4 |
| 6,321,530 | B1 * | 11/2001 | Hoshi et al. | 60/274 |
| 6,991,052 | B2 * | 1/2006 | Nogi et al. | 180/65.2 |
| 7,059,116 | B2 * | 6/2006 | Kusada et al. | 60/285 |
| 7,104,044 | B2 * | 9/2006 | Moore et al. | 60/284 |
| 7,316,108 | B2 * | 1/2008 | Pott et al. | 60/299 |

FOREIGN PATENT DOCUMENTS

| | | |
|---|---|---|
| JP | 11-125136 A | 5/1999 |
| JP | 2000-104588 A | 4/2000 |
| JP | 2001-173504 A | 6/2001 |

* cited by examiner

*Primary Examiner*—Binh Q Tran
(74) *Attorney, Agent, or Firm*—Crowell & Moring LLP (57) ABSTRACT

A start-up assisting degree by a motor is set at an appropriate level on the basis of a catalyst condition represented by a catalyst temperature, an oxygen storage (degree) in the catalyst, a change in combustion control represented by an air-fuel ratio for combustion, an ignition timing, or an engine condition such as an engine stopping time period, an engine cooling water temperature, a crank stopping position or rotational load.

4 Claims, 7 Drawing Sheets

CONTROLLER FOR INTERNAL COMBUSTION ENGINE

BACKGROUND OF THE INVENTION

The invention relates to a controller for an internal combustion engine, particularly to a controller for an internal combustion engine for controlling a restart of the internal combustion engine for an idling stop.

In recent years, for purposes of decreasing a fuel consumption and an amount of an exhaust gas of the internal combustion engine, a number of automobiles in which the idling stop is performed increases. For performing the idling stop, various techniques for stopping automatically the internal combustion engine when the internal combustion engine is in an idling condition during a stoppage of the automobile, and subsequently restarting automatically the internal combustion engine for start moving, have been proposed.

In the idling stop, if a time period for restarting the internal combustion engine is long, the start of movement of the automobile is delayed in comparison with a driver's intension for the start moving to deteriorate a drivability. Therefore, in an idling stop control, it is important for the internal combustion engine to be restarted quickly and smoothly.

Further, in an idling stop system for restarting the internal combustion engine by cranking the internal combustion engine up with a starter motor or the like, a great amount of electric power is required for the cranking up to cause a provability of that a lack in electric power of a battery electric power source occurs to prevent temporarily an electric load from being activated when restarting. Further, a load to the battery is great to accelerate a deterioration of the battery.

Therefore, for a multi-cylinder 4-cycle direct-injection spark-ignition engine, a restarting method in which a fuel is injected in a cylinder in expansion stroke when the internal combustion engine is stopped, and the ignition is performed after the fuel injection to utilize a rotational torque generated by a combustion, is proposed.

However, in a prior art disclosed by JP-A-11-125136, a reduction in exhaust gas on the restarting for satisfying emission regulations tightened year after year is not considered.

For an improvement in exhaust gas characteristic on the restarting of the internal combustion engine, a control method in which an air-fuel ratio is made rich temporarily on the restating to prevent a deterioration in exhaust gas, particularly in NOx on the restarting of the internal combustion engine in an air fuel ratio control device of the internal combustion engine, is proposed (by, for example, JP-A-2000-104588).

BRIEF SUMMARY OF THE INVENTION

A start of the internal combustion engine is resolved by a total amount of a torque generated by the combustion of the internal combustion engine and the rotational torque (start assisting amount) of the motor, and the internal combustion engine can be started when the total amount exceeds a predetermined value.

But, in the prior art disclosed by the patent document 2, it is not considered that the torque generated by the combustion is varied in accordance with the air-fuel ratio compensated to improve the characteristic of the exhaust gas when restarting. In this prior art, since the start assisting value of the motor is kept constant irrespective of the compensation of the air-fuel ratio, a starting performance is varied. For example, when the torque generated by the engine combustion is decreased by the compensation of the air-fuel ratio, the torque for starting the internal combustion engine becomes insufficient to cause a probability of that a time period for the starting becomes elongated to prevent the starting.

The invention is based on the above problem, and an object of the invention is to provide a controller of the internal combustion engine satisfying both of the reduction in the exhaust gas and the starting performance, and realizing the restarting optimized in a consumed energy.

A controller for an internal combustion engine including a motor for applying a rotational torque to a crank shaft so that the internal combustion engine is brought into action, according to the invention, comprises: an exhaust emission purifier (catalyst, or three way catalyst) condition detecting means for detecting a condition of an exhaust emission purifier (catalyst, or three way catalyst) arranged on an exhaust pipe of the internal combustion engine, and a start-up assist controlling means for determining a start-up assisting degree of the motor on the basis of the condition of the exhaust emission purifier (catalyst) detected by the exhaust emission purifier condition detecting means (catalyst condition detecting means) when the internal combustion engine is restarted.

A controller for the internal combustion engine including the motor for applying the rotational torque to the crank shaft so that the internal combustion engine is brought into action, according to the invention, comprises: an air-fuel ratio adjusting means for adjusting an air-fuel ratio of the internal combustion engine, the exhaust emission purifier condition detecting means for detecting the condition of the exhaust emission purifier arranged on the exhaust pipe of the internal combustion engine, and a start-up assist controlling means for determining the air-fuel ratio on the basis of the condition of the exhaust emission purifier detected by the exhaust emission purifier condition detecting means and determining a start-up assisting degree of the motor on the basis of the air-fuel ratio, when the internal combustion engine is restarted.

A controller for the internal combustion engine including the motor for applying the rotational torque to the crank shaft so that the internal combustion engine is brought into action, according to the invention, comprises: an ignition timing adjusting means for adjusting an ignition timing of the internal combustion engine, the exhaust emission purifier condition detecting means for detecting the condition of the exhaust emission purifier arranged on the exhaust pipe of the internal combustion engine, and a start-up assist controlling means for determining the ignition timing on the basis of the condition of the exhaust emission purifier detected by the exhaust emission purifier condition detecting means and determining a start-up assisting degree of the motor on the basis of the ignition timing, when the internal combustion engine is restarted.

In the controller for the internal combustion engine, according to the invention, the exhaust emission purifier condition detecting means preferably detects at least one of an oxygen storage (degree) of the exhaust emission purifier and a temperature of the exhaust emission purifier.

In the controller for the internal combustion engine, according to the invention, the start-up assisting degree of the motor determined by the start-up assist controlling means is preferably at least one of a torque generated by the motor and a time period during which the torture is generated by the motor.

In the controller for the internal combustion engine, according to the invention, the internal combustion engine has preferably a fuel supply means (fuel feed means) capable of injecting a fuel directly into a combustion chamber of the internal combustion engine, and the fuel is injected into an engine cylinder in an expansion or compression stroke of the internal combustion engine.

In the controller for the internal combustion engine, according to the invention, the start-up assist controlling means compensates preferably the start-up assisting degree on the basis of a time period in which the engine is stopped, a cooling water temperature of the engine.

In the controller for the internal combustion engine, according to the invention, the start-up assist controlling means compensates the start-up assisting degree on the basis of a position of the crank at which the internal combustion engine is stopped.

According to the invention, since the start-up assisting degree of the motor is determined on the basis of the condition of the condition of the exhaust emission purifier of the internal combustion engine, a starter for optimizing an energy consumed for the starting with improving the characteristic of the exhaust gas of the internal combustion engine when being started and making a start-up performance constant, is realized.

Further, since a torque for starting the internal combustion engine is optimized for minimum start-up assist, an electric power is prevented from being consumed excessively to improve a fuel consumption and to decrease a load to an electric source of the battery or the like for the motor.

According to the invention, a controller for starting up an internal combustion engine including a catalyst for purifying an exhaust gas of the internal combustion engine, and a rotational shaft capable of being rotationally driven by a combustion torque generated by a combustion in the internal combustion engine and by a motor torque generated by a motor so that the combustion is started up and continued, comprises:

an air-fuel ratio controller for controlling an air-fuel ratio for the combustion to be supplied into the internal combustion engine so that the rotational shaft is rotationally driven by the combustion torque, an ignition timing controller for controlling an ignition timing of the combustion so that the rotational shaft is rotationally driven by the combustion torque, and a motor controller for controlling the motor torque so that the rotational shaft is rotationally driven by the motor torque, wherein the motor controller determines at least one of a value of the motor torque and a time period during which the value of the motor torque more than a predetermined motor torque value is kept to be changed in accordance with at least one of a value of the combustion torque and a torque loss in the internal combustion engine so that at lease one of that the smaller the value of the combustion torque is, the greater the at least one of the value of the motor torque and the time period is, and that the greater the torque loss is, the greater the greater the at least one of the value of the motor torque and the time period is, is satisfied. Therefore, an output of the motor for driving the internal combustion engine to be started up can be prevented from being excessive and insufficient even when the combustion torque or torque loss is varied significantly by various conditions.

If the motor controller determines the at least one of the value of the motor torque and the time period before at least one of a fuel injection and an ignition is restarted after the at least one of the fuel injection and the ignition is stopped, a change in condition causing the significant variation of the combustion torque or torque loss occurring before at least one of a fuel injection and an ignition is restarted after the at least one of the fuel injection and the ignition is stopped, can be taken into consideration for preventing the output of the motor from being excessive and insufficient.

The value of the combustion torque may be estimated from at least one of the air-fuel ratio for starting up the internal combustion engine, the ignition timing for starting up the internal combustion engine, a time period during which the internal combustion engine is stopped before being restarted, a rotational position of the rotational shaft of stoppage before the internal combustion engine is started up, a temperature of the internal combustion engine of stoppage before the internal combustion engine is started up, a temperature of the catalyst measured before at least one of a fuel injection and an ignition is restarted after the fuel injection and the ignition are stopped and a concentration of at least one of HC, CO and NOx included by the exhaust gas discharged from the catalyst before the internal combustion engine is stopped to be restarted along at lease one of a theoretically or experimentally predetermined relationship between the air-fuel ratio and the combustion torque, a theoretically or experimentally predetermined relationship between the ignition timing and the combustion torque, a theoretically or experimentally predetermined relationship between the time period and the combustion torque, a theoretically or experimentally predetermined relationship between the rotational position and the combustion torque, a theoretically or experimentally predetermined relationship between the temperature of the internal combustion engine and the combustion torque, a theoretically or experimentally predetermined relationship between the temperature of the catalyst and the combustion torque, a theoretically or experimentally predetermined relationship between the concentration of the at least one of HC, CO and NOx and the combustion torque corresponding to the at least one of the air-fuel ratio, the ignition timing, the time period, the rotational position, the temperature of the internal combustion engine, the temperature of the catalyst and the concentration of the at least one of HC, CO and NOx.

The torque loss may be estimated from at least one of a temperature of the internal combustion engine of stoppage before the internal combustion engine is started up and a gradient in decreasing velocity of the rotational shaft after the fuel injection and ignition are stopped before the internal combustion engine is started up along at least one a theoretically or experimentally predetermined relationship between the torque loss and the temperature of the internal combustion engine of stoppage and a theoretically or experimentally predetermined relationship between the torque loss and the gradient in decreasing velocity of the rotational shaft corresponding to the at least one of the temperature of the internal combustion engine and the gradient in decreasing velocity of the rotational shaft.

At least one of the air-fuel ratio and ignition timing for starting up the internal combustion engine may be determined from at least one of a temperature of the catalyst measured before at least one of a fuel injection and an ignition is restarted after the fuel injection and the ignition are stopped and a concentration of at least one of HC, CO and NOx included by the exhaust gas discharged from the catalyst before the internal combustion engine is stopped to be restarted along at least one of a theoretically or experimentally predetermined relationship between the at least one of the air-fuel ratio and ignition timing for starting up the internal combustion engine and the temperature of the catalyst and a theoretically or experimentally predetermined relationship between the at least one of the air-fuel ratio and ignition timing for starting up the internal combustion engine and the concentration corresponding to the at least one of the temperature of the catalyst and the concentration.

Other objects, features and advantages of the invention will become apparent from the following description of the embodiments of the invention taken in conjunction with the accompanying drawings.

DETAILED DESCRIPTION OF THE INVENTION

Embodiments to which controllers for internal combustion engine of the invention are applied, are explained with making reference to the drawings.

Figure 1:
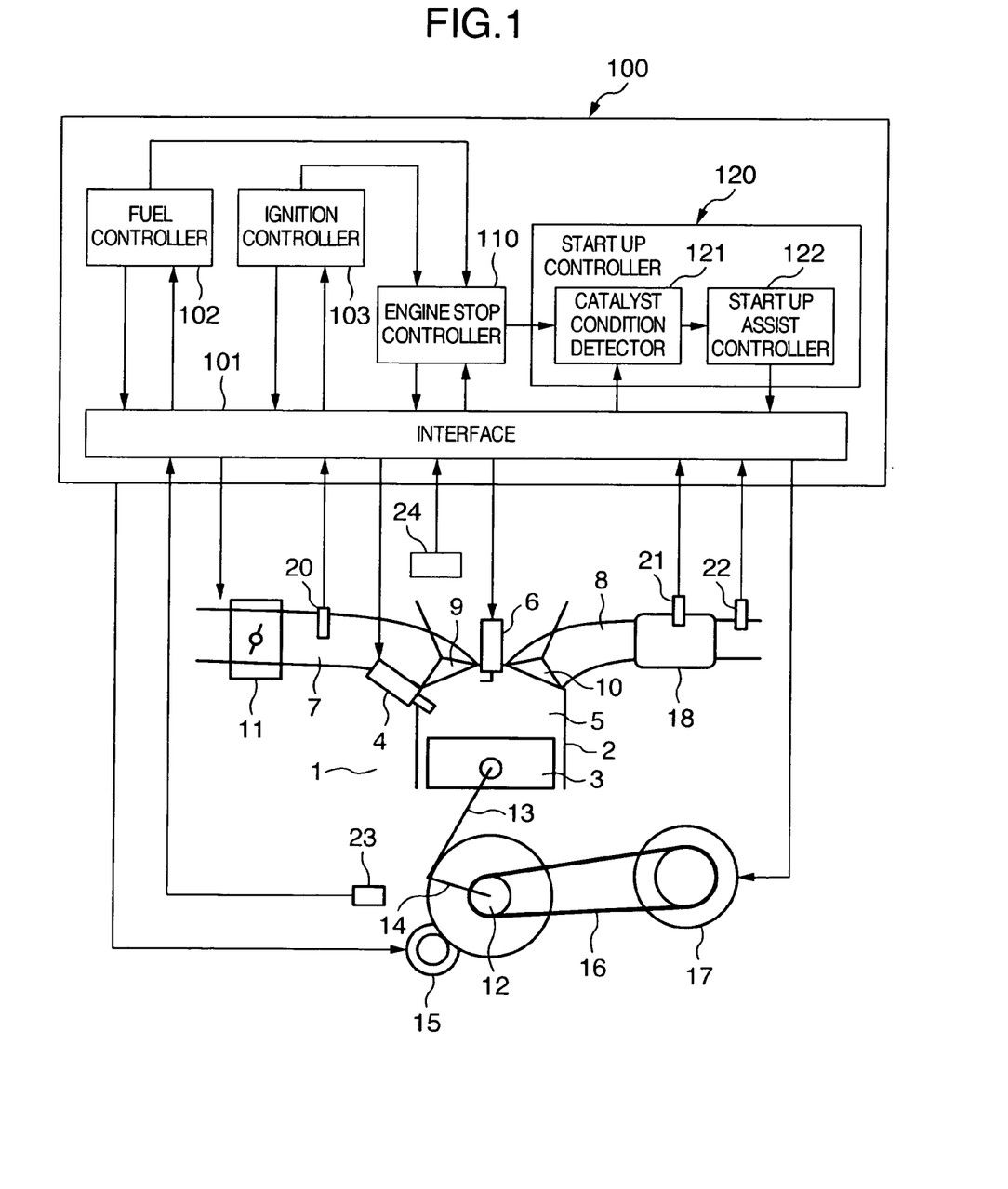
FIG. 1 is a view showing a whole of an internal combustion engine to which an embodiment (embodiment 1) of a controller for the internal combustion engine of the invention is applied.

FIG. 1 is a view showing a whole of structure of an internal combustion engine having the controller as the embodiment of the invention, and the internal combustion engine 1 as, for example, a four-cycle engine to be mounted on an automobile, has a plurality of cylinders 2.

Incidentally, FIG. 1 shows only one of the cylinders 2, but the other ones of the cylinders 2 has a common structure. In the following description, the internal combustion engine 1 is occasionally called as the engine 1. A number of the cylinders 2 of the internal combustion engine 1 is, 3, 4, 6 or 8, to be called as 3 cylinders, 4 cylinders, 6 cylinders or 8 cylinders.

A piston 3 is arranged in the cylinder 2 to cooperate with the cylinder 2 to define a combustion chamber 5.

In the internal combustion engine, a fuel is injected directly into the combustion chamber 5 from a fuel injection valve 4 for each of the cylinders to constitute an internal combustion engine of cylinder injection of fuel in which a mixture of the injected fuel and an air in the combustion chamber is ignited by an ignition plug 6.

In the internal combustion engine, the fuel injection valve 4 may be mounted on an intake air pipe 7 so that the fuel and the air are mixed with each other before being taken into the combustion chamber 5.

The internal combustion engine 1 has a connecting rod 13 and a crank arm 14 to transmit a reciprocal movement of the piston 3 as a rotational movement of a crank shaft 12.

The internal combustion engine 1 has an intake air valve 9 for opening and closing a communication between the combustion chamber 5 and the intake air pipe 7 and an exhaust valve 10 for opening and closing a communication between the combustion chamber 5 and an exhaust pipe 8.

A throttle valve 11 of electrically controlled type for adjusting a flow rate of an intake air and an intake air flow rare sensor 20 for measuring the flow (rate) of the intake air are arranged on the intake air pipe 7.

A catalyst 18 as an exhaust emission purifier for purifying the exhaust gas discharged from the combustion chamber 5 by at least one of oxidizing at least one of HC and CO as unburnt fuel in the exhaust gas and oxidation-reduction of NOx in the exhaust gas, a catalyst temperature sensor 21 for generating a signal corresponding to an inner temperature of the catalyst 18 and an air-fuel ratio sensor 22 for detecting an air-fuel ratio from a concentration of oxygen in the exhaust gas, are arranged on the exhaust pipe 8.

The internal combustion engine 1 has a starter motor 15 for rotationally driving the crank shaft 12 through a not-shown gear mechanism from an outside. Incidentally, the starter motor 15 may controlled in accordance with a supplied electric current controlled to adjust a velocity of rotation (cranking) of the crank shaft 12 or voltage or in accordance with on-off control of supplied energy as well known without controlling the electric current or voltage.

Further, as another structure for cranking, a motor 17 for transmitting the rotational energy to the crank shaft 12 through, for example, a belt mechanism, may be arranged around the crank shaft 12.

Further, the internal combustion engine 1 has a crank angle sensor 23 for outputting a signal corresponding to a rotational angle of the crank shaft, and a water temperature sensor for outputting a signal corresponding to an engine cooling water temperature. Incidentally, the crank angle sensor 23 is preferably capable of measuring the rotational angle of each of a rotational direction of the crank shaft 12 and a reverse rotational direction thereof as a resolver used for rotational control of the motor.

As a controller for the internal combustion engine, an engine control unit (ECU) 100 is arranged. The ECU 100 is a microcomputer type including a microprocessor and peripheral devices such as RAM, ROM (not shown) and so force.

The ECU 100 receives the sensor signals through the interface 101 from the intake-air flow (rate) sensor 20, catalyst temperature sensor 21, air-fuel ratio sensor 22, crank angle sensor 23 and water temperature sensor 24 to perform various treatments for controlling an operating condition of the internal combustion engine along a computer program recorded in the ROM.

Therefore, the ECU 100 has, as basic components thereof, the interface 101, fuel controller 102 and ignition controller 103.

The fuel controller 102 adjusts a fuel injection rate of the fuel injection valve 4 on the basis of the intake-air flow rate measured by the intake-air flow (rate) sensor 20 and the engine rotational speed calculated from the crank angle measured by the crank angle sensor 23 so that the air-fuel ratio measured by the air-fuel sensor 22 arranged on the exhaust pipe 8 becomes a predetermined air-fuel ratio. The ignition controller 103 adjusts the ignition timing of the ignition plug 6.

The ECU 100 has the stoppage controller 110 for controlling the idling stop as well as an automatic restart, and the star-up controller 120.

The interface 101 performs for the idling stop control, an input process for taking into the ECU the signals from the sensors for detecting the conditions required for starting, stopping and operating the internal combustion engine, and an output process for controlling and driving the fuel injection valve 4, ignition plug 6, throttle valve 11, starter motor 15, motor 17 and so forth required for starting, stopping and operating the internal combustion engine.

The stoppage controller 110 controls the stoppage of the internal combustion engine on the basis of ordered values for the fuel injection valve 4, ignition plug 6 and throttle valve 11 by the fuel controller 102 and ignition controller 103.

The star-up controller (restart controller) 120 calculates, when the internal combustion engine 1 is started up (restarted), the ordered values for the fuel injection valve 4, ignition plug 6 and throttle valve 11 to control the combustion of the internal combustion engine 1, calculates ordered values for the starter motor 15 and motor 17 to control a start-up assisting value, and has the catalyst condition detector 121 and start-up assist controller 122.

The catalyst condition detector 121 detects an exhaust gas purifying performance by detecting an activated condition of the catalyst 18 and an ambience in the catalyst on the basis of the signals of the catalyst temperature sensor 21 and the air-fuel ratio sensor 22, or estimates the exhaust gas purifying performance with estimating the activated condition of the catalyst 18 and the ambience in the catalyst from an operating condition of the internal combustion engine 1.

When the internal combustion engine 1 is started (restarted), the start-up assist controller 122 calculates the start-up assisting degree to order the starter motor 15 or the motor 17 on the basis of the condition of the catalyst detected by the catalyst condition detector 121. That is, the start-up assist controller 122 determines the start-up assisting degree of the starter motor 15 or the motor 17 on the basis of the condition of the catalyst.

Next, a control flow for starting control by the controller of the embodiment will be explained.

Figure 2:
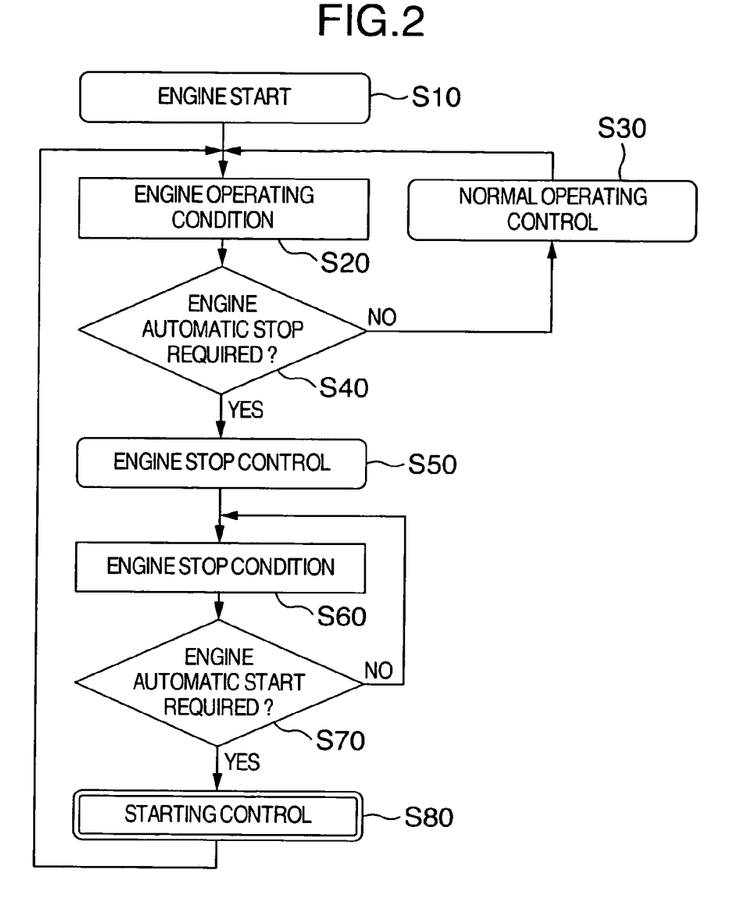
FIG. 2 is a flow chart showing briefly a sequential control from a start to a stoppage by the controller for the internal combustion engine in FIG. 1.

Before explaining the control flow for starting control, a sequential operation from the start of the internal combustion engine 1 to the stoppage thereof is explained briefly with using a process flow of FIG. 2.

The start and stoppage of the internal combustion engine 1 are carried out by the start-up controller 120 and the stoppage controller 110 in the ECU. Further, the ECU determines the start and stoppage of the internal combustion engine along another process flow to carry out the start control and stoppage control on the basis of the ordered control and stoppage.

The control and stoppage to be ordered are determined from information of the catalyst condition sensor 21, the air-fuel ratio sensor 22, the water temperature sensor 24, not-shown starter switch, automobile velocity sensor, fuel pressure sensor, brake stitch, transmission gear position sensor, brake negative-pressure sensor, intake air temperature sensor or electric load sensor (representing using condition of an electric load such as an air conditioner, head-lamp, radiator fan or the like) and a battery voltage.

For example, the stoppage is ordered in the idling condition in which the automobile is stopped, the internal combustion engine has been warmed up, the brake is activated and the accelerator pedal is not pressed.

The restart is ordered in response to a change from the idling condition, that is, to an operation for starting the automobile, for example, a release of the brake, a pressing of the accelerator pedal, a shift-change operation or the like, or a change in condition of the internal combustion engine or the automobile such as a decrease or increase of the cooling water temperature of the engine, a decrease of the negative-pressure of the brake, a decrease in temperature of the catalyst, a decrease in pressure of the fuel, an increase of the electric load or the like.

That is, the sequential process flow from the stoppage to start of the internal combustion engine as shown in FIG. 2 carries out the idling stop in which the internal combustion engine is temporarily stopped when the automobile is stopped, and the internal combustion engine 1 is restarted before starting the automobile.

At first, the starter motor 15 or motor 17 is activated in response to a starter switch operation or the like by a driver to start the internal combustion engine (step S10) so that the engine becomes of working condition (step S20).

When the internal combustion engine is working, whether or not the stoppage is ordered is determined (step S40). When the stoppage of the engine is not ordered, a normal operation control (step S30) is continued to keep the internal combustion engine in the working condition, and whether or not the stoppage is ordered is determined again.

When the stoppage of the engine is ordered, a stoppage control (step S50) is carried out. In the stoppage control (step S50), the fuel supply and ignition are stopped to stop the combustion of the internal combustion engine. In this time, a crank stop position control for stopping, when stopping completely the rotation of the internal combustion engine 1, the crank shaft at a position thereof suitable for the restart, may be carried out.

The internal combustion engine 1 in which the rotation is stopped is in an engine stoppage condition (step S60) and stands ready to be ordered to restart. In this time, the information of the position of the crank shaft in stoppage and of the stroke in each of the cylinders is kept in the stoppage condition of the internal combustion engine until an electric power source is cut off from the ECU.

Next, whether or not the internal combustion engine 1 is ordered to restart is determined (step S70). When the internal combustion engine 1 is not ordered to restart, the stoppage condition (step S60) is continuously kept, and the whether or not the internal combustion engine 1 is ordered to restart is determined again (step S70).

When the restart is ordered, the start-up control (step S80) is carried out to rapidly restart the internal combustion engine 1. The process in the start-up control (step S80) will be explained in detail below. When the start-up control (step S80) is completed, the engine working condition (step S20) is kept until the stoppage is ordered.

Figure 3:
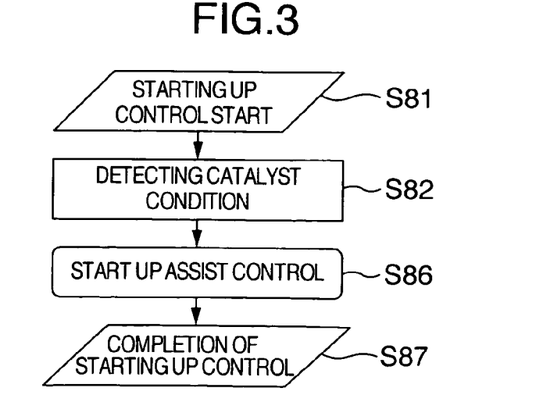
FIG. 3 is a flow chart showing in detail a start-up control in the embodiment 1 in FIG. 1.

Next, the start-up control (step S80) to be carried put when the restart is ordered in the stoppage condition (step S60) of the internal combustion engine 1 is explained with the process flow of FIG. 3.

The start-up control (step S80) is carried out by the catalyst condition detector 121 and start-up assist controller 122 in the start-up controller 120 of the ECU.

When the restart is ordered, the start-up control is started (step S81) to detect firstly the condition of the catalyst (step S82).

In a catalyst condition detecting (step S82), an inner temperature and oxygen storage (rate) (degree of oxygen amount stored in the catalyst) of the catalyst 18 is detected or estimated to obtain a degree of activation of the catalyst 18 and the air-fuel ratio in the catalyst representing the condition of the catalyst 18. The inner temperature of the catalyst 18 may be detected by the catalyst temperature sensor 21, the oxygen storage (rate) may be detected by the air-fuel ratio sensor 22, or the inner temperature and oxygen storage (rate) of the catalyst 18 may be estimated from the working condition of the internal combustion engine 1 by the ECU as, for example, an air fuel ratio controller disclosed by JP-A-2000-104588 or a catalyst temperature estimating device disclosed by JP-A-2001-173504.

From detecting or estimating the temperature of the catalyst 18, at what degree a function of activating the catalyst 18 to remove HC, CO, NOx or the like discharged from the combustion chamber 5 is effective, is detected.

Further, from detecting or estimating the oxygen storage (rate) of the catalyst 18, a reduction degree (richness) and an oxidizing degree (leanness) of ambience in the air-fuel ratio in the catalyst is detected. This catalyst condition detecting (step S82) may be carried out in the engine stoppage condition (step S60) just before the star-up control (step S80).

Thereafter, the star-up assist control (step S86) is carried out so that the start-up assisting degree is determined on the basis of the condition of the catalyst measured by the previous step to order the starter 15 or motor 17 to perform a rotational assisting for the start-up. In this situation, the start-up assisting degree may be at least one of a value of torque generated by the motor and a time period during which the motor generates the torque. How to calculate the start-up assisting degree will be explained in detail below.

Finally, the start-up assist is carried out to generate the combustion by starting both the fuel injection and ignition, and the start-up control is completed when a predetermined requirement such as the engine rotational speed more than a predetermined value is satisfied to complete the start-up (step S87).

For example, in a case of starting the combustion by generating the combustion just after starting the star-up to combine a rotational torque by the combustion and a rotational torque of the motor for the start-up assist to improve a start-up performance, the rotation for the star-up assist by the starter motor 15 or motor 17 is started in accordance with the condition of the catalyst simultaneously with starting the combustion by injecting the fuel and igniting in the cylinder in expansion stroke at the start of the start-up or the stoppage condition (step S87).

Subsequently, the fuel injection and ignition are carried out in order from the cylinder in compression stroke at the stoppage condition (step S60) to the cylinder in intake stroke at the stoppage condition (step S60) to continue the combustion so that the rotational speed of the internal combustion engine 1 is increased. Thereafter, in response to that the rotational speed of the internal combustion engine 1 exceeds a predetermined value (for example, 600 rpm) or a gradient in increase of the rotational speed of the internal combustion engine exceeds a predetermined value, it is determine that the start-up of the internal combustion engine 1 is completed to finish the start-up assist so that the start-up assisting control (step S86) is ended.

Figure 4:
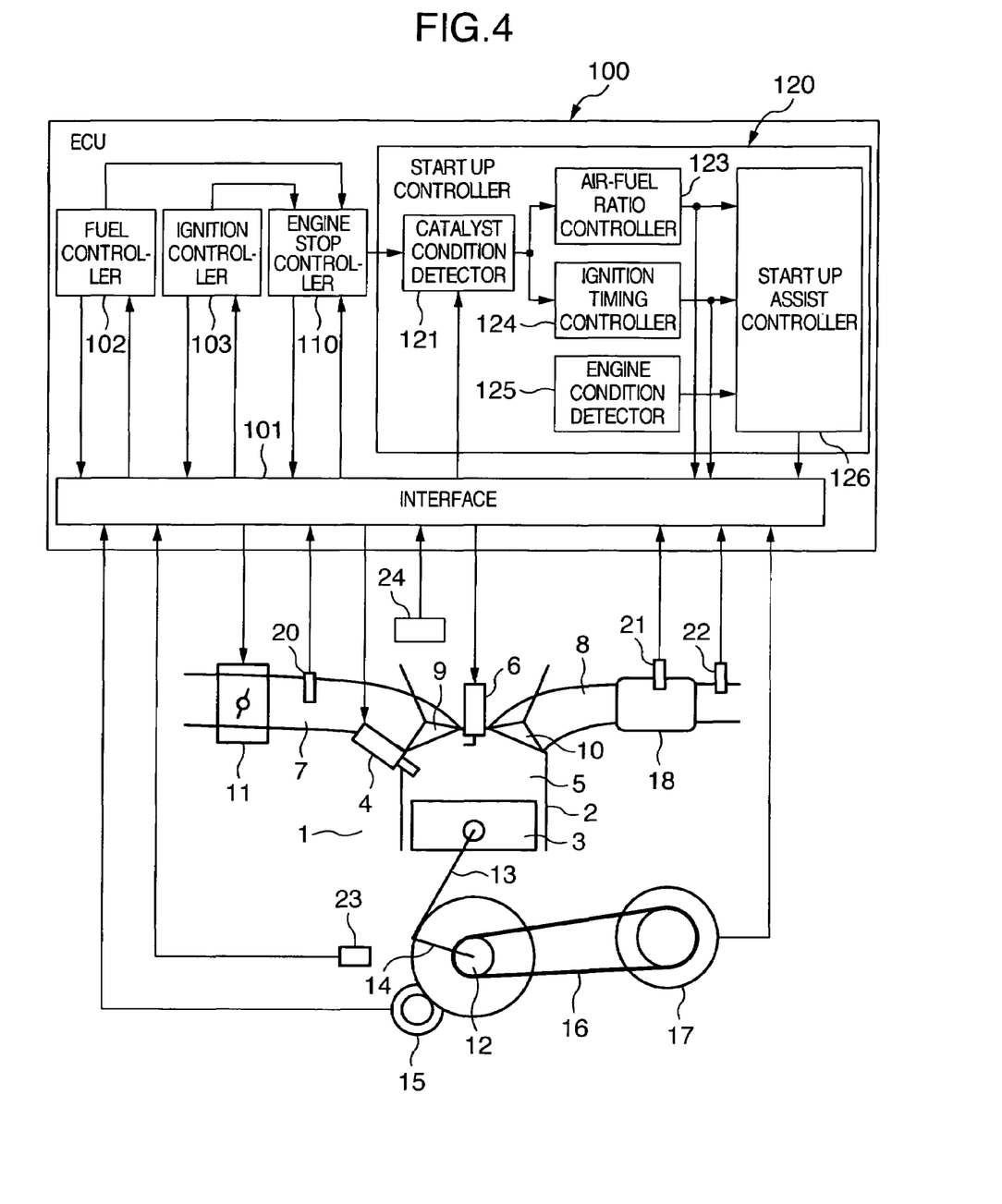
FIG. 4 is a view showing a whole of an internal combustion engine to which an embodiment (embodiment 2) of a controller for the internal combustion engine of the invention is applied.

The other embodiments (embodiment 2) of the controller and the internal combustion engine to which the controller is applied, are explained with making reference to FIG. 4. Incidentally, in FIG. 4, elements corresponding to FIG. 4 are denoted by the common reference codes attached to FIG. 4 to omit the explanation therefor.

The interface 101 of the ECU 100 carries out, in the idling stop control, an input process to input into the ECU signals from the sensors for detecting the conditions required for starting, stopping and continuing the working of the internal combustion engine 1 and an output process to drive and control the fuel injection valve 4, ignition plug 6, throttle valve 11, starter motor 15, motor 17 and so forth required for starting, stopping and continuing the working of the internal combustion engine 1.

The start-up controller 120 calculates the values by which the fuel injection valve 4, ignition plug 6 and throttle valve 11 are ordered to control the combustion of the internal combustion engine 1 when the internal combustion engine 1 is started up, while calculating the value by which the starter motor 15 or motor 17 is ordered to adjust the start-up assisting degree, and includes the catalyst condition detector 121, air-fuel ratio controller 123, ignition timing controller 124, engine condition detector 125 and start-up assisting controller 126.

The catalyst condition detector 121 detects or estimates the condition in activation of the catalyst 18 and the ambient in the catalyst on the basis of the signals from the catalyst temperature sensor 21 and the air-fuel ratio sensor 22 to detect the characteristic of the catalyst for purifying the exhaust gas.

The air-fuel ratio controller 123 determines the air-fuel ratio for combustion on the basis of the condition of catalyst detected by the catalyst condition detector 121 to improve the performance of purifying the exhaust gas on the start-up, and calculates values by which the fuel injection valve 4 and the throttle valve 11 are ordered to obtain the air-fuel ratio for combustion.

The ignition timing controller 124 determines the ignition timing on the basis of the condition of catalyst detected by the catalyst condition detector 121 to improve the performance of purifying the exhaust gas on the start-up, and calculates values by which the ignition plug is ordered.

The engine condition detector 125 detects or estimates a time period of the engine stoppage, engine cooling water temperature, stop position of the crank shaft and rotational load of the internal combustion engine to detect factors varying the start-up performance of the internal combustion engine such as the torque generated by the combustion of the internal combustion engine on the start-up and the rotational load on the start-up.

The engine cooling water temperature is detected by the water temperature sensor 24, and the stop position of the crank shaft is detected by the crank angle sensor 23. Further, the rotational load of the internal combustion engine 1 may be estimated by for example, detecting a gradient in decrease of the engine rotational speed for stopping the internal combustion engine to determine a value of the rotational load in accordance with a value of the gradient in decrease.

The start-up controller 126 determines the start-up assisting degree by which the starter motor 15 or motor 17 is ordered to start up the internal combustion engine, on the basis of the air-fuel ratio for combustion obtained by the air-fuel ratio controller 123, the ignition timing obtained by the ignition timing controller 124, the time period of engine stoppage detected by the engine condition detector 124, the engine cooling water temperature, the stop position of the crank shaft and the rotational load of the internal combustion engine 1.

Figure 5:
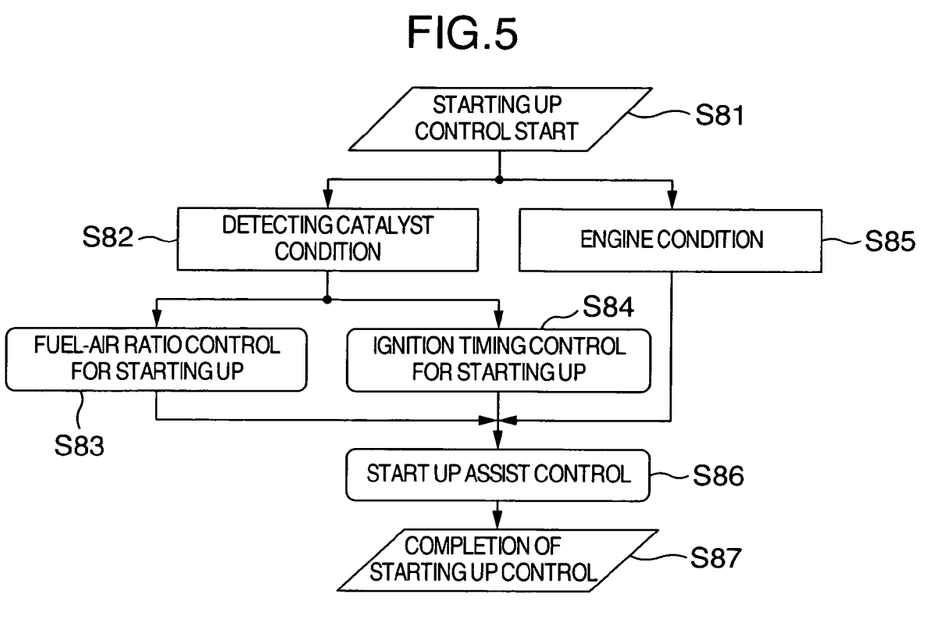
FIG. 5 is a flow chart showing in detail a start-up control in the embodiment 2 in FIG. 4.

Next, a process flow for the start-up control in this embodiment will be explained with making reference to FIG. 5. The start-up control (step S80 in FIG. 2) is carried out by the catalyst condition detector 121 in the start-up controller 120, the air-fuel ratio controller 123, ignition timing controller 124, engine condition detector 124 and start-up controller 126 of the ECU 100.

In response to a requirement for the restart on the stoppage condition of the internal combustion engine 1, the start-up control is started (step S81), and at first, detecting the condition of the catalyst (step S82) and detecting the condition of the engine (step S85) are carried out.

In detecting the condition of the catalyst (step S82), the inner temperature and oxygen storage (rate) representing the conditions of the catalyst 18 are detected.

In detecting the condition of the engine (step S85), the time period of the engine stoppage (step S60 in FIG. 2), the engine cooling water temperature, the stop position of the crank shaft and the rotational load of the internal combustion engine as the conditions of the engine are detected. By detecting the engine cooling water temperature and the rotational load of the internal combustion engine, a value of torque required for the start-up of the internal combustion engine is obtained.

The torque supplied to the internal combustion engine 1 to be started up is a total amount of the torque generated by the combustion and the torque supplied by the motor.

Therefore, from the torque generated by the combustion control for improving the characteristic of the exhaust gas, the value of the torque to be supplied by the motor for the start-up assist is calculated.

For example, when the engine cooling water temperature is low or the rotational load is great, the torque required for the start-up of the internal combustion engine is great, and the torque to be supplied by the motor for the start-up assist is increased if the torque by the combustion determined for the characteristic of the exhaust gas does not vary.

Further, the time period of the engine stoppage and the stop position of the crank shaft have effect for the torque generated by the combustion for the start-up of combustion just after starting the start-up. Therefore, the torque by the motor for the start-up is adjusted in accordance with the time period of the engine stoppage and the stop position of the crank shaft to restraining the performance for the start-up from being changed.

For example, when the time period of the engine stoppage is long to decrease the pressure in the cylinder of the combustion chamber 5 in comparison with that just after the engine stop, or the stop position causes a decrease of the torque generated by the combustion just after starting the start-up, since the torque generated by the combustion on the start-up is small, the torque supplied by the motor is increased to satisfy the torque required for the start-up. Detecting the condition of the catalyst (step S82) or detecting the condition of the engine (step S85) may be carried out during the stoppage of the engine just before the start-up control.

Next, on the basis of the condition of the catalyst detected previously, the air-fuel ratio for combustion and the ignition timing for the start-up are calculated with compensating. For example, when the oxygen storage (rate) in the catalyst 18 is lean in the catalyst condition detecting (step S82), the air-fuel ratio for combustion is temporarily made relatively rich or the ignition timing is temporarily made relatively in delay, to make the oxygen storage (rate) in the catalyst 18 stoichiometry. The air-fuel ratio for combustion and the ignition timing may be compensated as disclosed by JP-A-2000-104588 and so forth.

Next, on the basis of the air-fuel ratio for combustion and the ignition timing calculated with compensation previously and the condition of the engine detected in detecting the engine condition (step S85), the start-up assisting control (step S86) is carried out to calculate the start-up assisting value by which the starter 15 or motor 17 is ordered.

In this situation, the start-up assisting value calculated by the start-up assisting control (step S86) may be a value of torque generated by the motor or a time period in which the motor generates the torque. How to calculate the start-up assisting value will be explained in detail below.

Finally, the start-up assist is carried out simultaneously with starting the fuel injection and ignition to generate the combustion, and the star-up control is completed (step S87) when a predetermined condition such as the engine rotational speed exceeding the predetermined value, or the like, is satisfied to complete the start-up.

For example, in a case of the combustion start wherein the combustion is generated just after starting the star-up to improve the start-up performance, the combustion is started in the cylinder in expansion stroke at the start of the start-up or the stoppage of the engine with the fuel injecting rate and ignition timing determined in accordance with the condition of the catalyst, while the starter motor 15 or motor 17 starts the star-up assist in accordance with the air-fuel ratio for combustion, ignition timing and the condition of the engine.

Subsequently, the fuel injection and ignition whose values are determined on the basis of the condition of catalyst are carried out in order from the cylinder in compression stroke at the engine stoppage to the cylinder of intake stroke at the engine stoppage, while the starter motor 15 or motor 17 performs the start-up assist of value calculated on the basis of the air-fuel ratio for combustion, ignition timing and the condition of the engine.

The motor control on the basis of the air-fuel ratio for combustion, ignition timing and the condition of the engine in accordance with the condition of catalyst is carried our in the other cylinders in order to continue the combustion so that the rotational speed of the internal combustion engine is increased. Thereafter, when the rotational speed of the internal combustion engine 1 exceeds the predetermined value (for example, 600 rpm) or the gradient in increase of the rotational speed of the internal combustion engine 1 exceeds the predetermined value, it is determined that the star-up of the internal combustion engine is completed, and the star-up assist is finished to end the start-up assisting control (step S86).

Next, how to calculate the start-up assisting degree in the start-up controller 120 for ordering the starter 15 or motor 17, is explained with making reference to FIGS. 6-9.

The start-up assisting degree calculated in the start-up controller 120 represents an energy supplied to start up the internal combustion engine, and represents a torque value generated by the starter 15 or motor 17 or a time period during which the torque is generated.

The internal combustion engine is enabled to be started up when a total amount of the torque of the motor applied to the internal combustion engine by the starter 15 or motor 17 and the torque of the combustion generated by the combustion of the internal combustion engine.

For decrease in the exhaust gas of the internal combustion engine at the start-up, the combustion needs to be controlled in accordance with the condition of the catalyst 18 which is most important for the characteristic of the exhaust gas. For example, when an inside of the catalyst 18 is lean at the start-up, the air-fuel ratio for combustion needs to be compensated to become rich for decrease in the exhaust gas. However, such compensation of the air-fuel ratio for combustion causes a variation in torque generated by the combustion.

Figure 6:
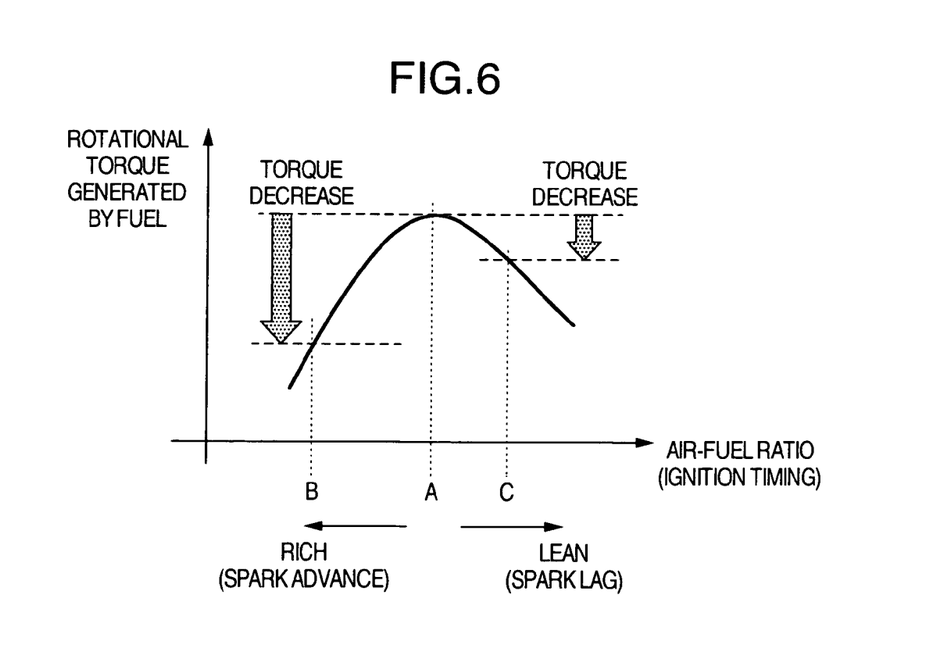
FIG. 6 is a view showing a relationship between an air-fuel ratio on start-up and a torque generated by combustion.

In FIG. 6, when the air-fuel ratio for combustion at the start-up is compensated from A point to B point to become rich for decrease in the exhaust gas, the torque generated by the combustion decreases accordingly. In this situation, for completing the start-up and obtaining the start-up performance as obtainable at the A point, a value in decrease of the torque by combustion caused by compensating the air-fuel ratio for combustion needs to be compensated by the torque by the motor.

On the contrary, when the inside of the catalyst 18 rich, for decrease in the exhaust gas at the restart, the air-fuel ratio for combustion needs to be compensated from the A point to C point to become lean, and the value in decrease of the torque thereby needs to be compensated by the torque by the motor.

Further, when the inside of the catalyst 18 is rich, the ignition timing needs to be compensated from A point to B point to become in advance for combustion for decrease in the exhaust gas at the restart so that the characteristic of the exhaust gas becomes lean, the value in decrease of the torque by combustion caused by compensating the ignition timing needs to be compensated by the torque by the motor.

On the contrary, when the inside of the catalyst 18 lean, for decrease in the exhaust gas at the restart, the ignition timing needs to be compensated from the A point to C point to become in delay for combustion so that the characteristic of the exhaust gas becomes rich, and the value in decrease of the torque of combustion caused by compensating the ignition timing needs to be compensated by the torque by the motor.

Therefore, since the torque generated by the combustion at the start-up is varied in accordance the condition of the catalyst 18, the value by which the torque by combustion is varied in accordance with the change of the combustion control needs to be compensated by the motor so that the start-up is completed with preventing the start-up performance from being changed.

Figure 7:
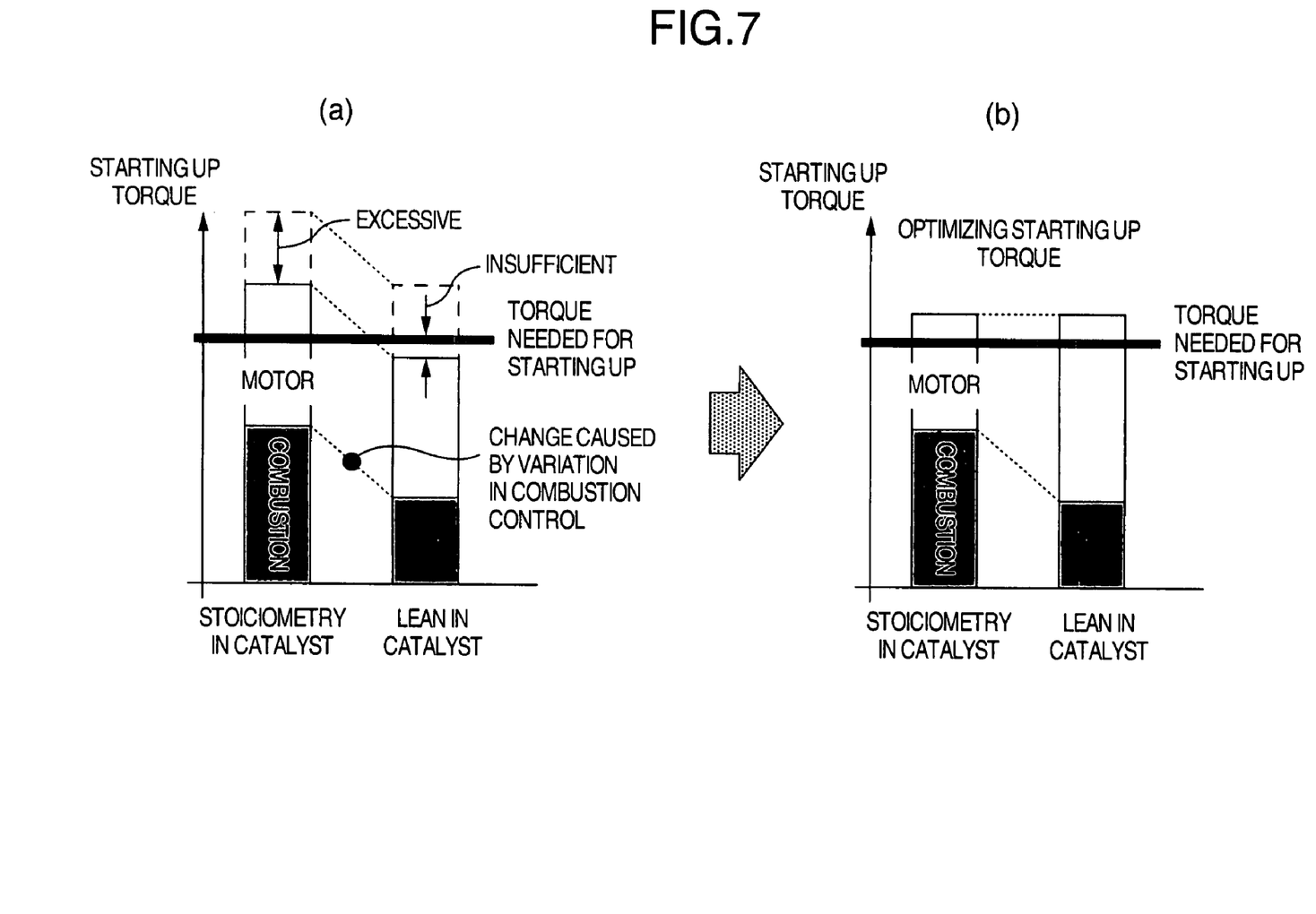
FIGS. 7a and 7b are diagrams showing relationships between the torque generated by combustion and a motor torque in accordance with a variation in condition of catalyst.

For example, as shown in FIG. 7(*a*), when the ambience in the catalyst 18 at the start-up is lean, the torque by the combustion is decreased by the change of the combustion control for improving the characteristic of the exhaust gas. In this situation, if the start-up assisting degree by the motor is kept constant, the torque supplied from the combustion and motor becomes excessive or insufficient for the torque required for starting-up the internal combustion engine so that the start-up performance varies.

According to the invention, as shown in FIG. 7(*b*), the start-up assisting degree by the motor is compensated at the restart in accordance with the change of the combustion control based on the condition of the catalyst. By compensating the start-up assisting degree by the motor, the torque supplied from the combustion and motor at the start-up of the internal combustion engine becomes optimum for the torque required for the start-up so that the start-up performance is made constant irrespective of the condition of the catalyst at the start-up.

Figure 8:
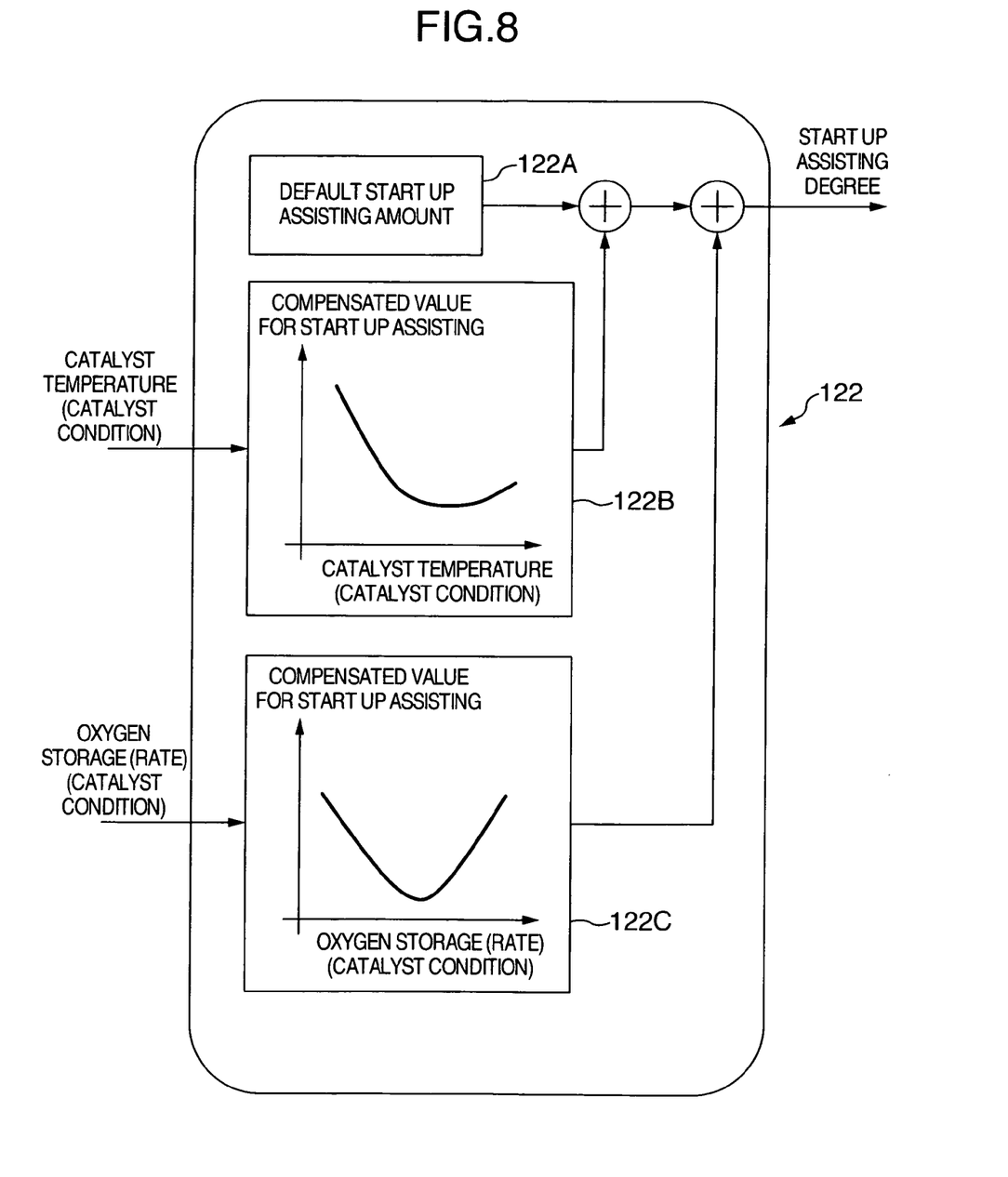
FIG. 8 is a block diagram showing in detail a start-up assist controller of the embodiment 1 in FIG. 1.

For calculation of the start-up assisting degree by the motor (calculation of the start-up assisting degree in the start-up assist controller 122), in the embodiment 1, for example, as shown in FIG. 8, the start-up assisting degree is calculated by adding the value calculated by the catalyst temperature compensator 122B to compensate the start-up assisting degree on the basis of the catalyst temperature representing the condition of the catalyst 18 and the value calculated by the oxygen storage (rate) compensator 122C to compensate the start-up assisting degree on the basis of the oxygen storage (rate) to the predetermined start-up assisting degree by the motor in the default start-up assisting degree setting device 122A. In this situation, the lower the temperature of the catalyst is or the greater an excessive or insufficient degree of the oxygen storage (rate) is, the greater the calculated value for compensating the start-up assisting degree is.

Figure 9:
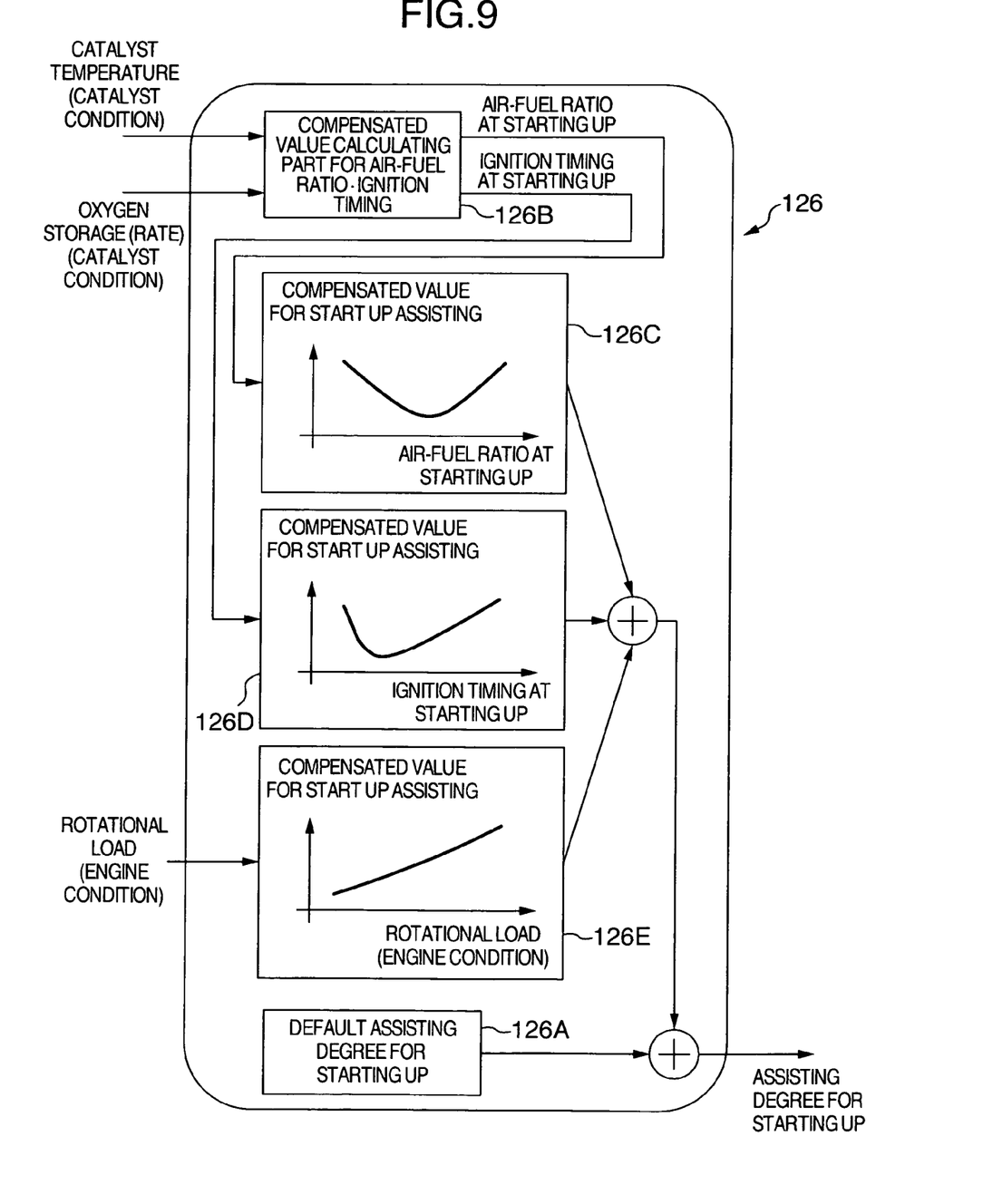
FIG. 9 is a block diagram showing in detail a start-up assist controller of the embodiment 2 in FIG. 4.

In the embodiment 2, the start-up assisting degree is not determined directly from the condition of the catalyst, but the start-up assisting degree by the motor is calculated on the basis of the change in torque for the star-up calculated from combustion control parameters such as the air-fuel ratio for the combustion and the ignition timing at the start up obtained from the condition of the catalyst (catalyst temperature and oxygen storage (rate)). In this situation, the greater a shift degree of the air-fuel ratio for the start-up to rich or lean side is or the greater a shift degree of the ignition timing to advance or delay side for combustion is, the greater the calculated value for compensating the start-up assisting degree is.

In the embodiment 2, the start-up assisting controller 126 has, as shown in FIG. 9, the default start-up assisting degree setting device 126A, the air-fuel ratio for combustion-ignition timing compensating value calculator 126B for calculating the value by which the air-fuel ratio for combustion and the ignition timing at the start-up are compensated on the basis of the catalyst condition and the oxygen storage (rate), a compensating value calculator 126C for calculating the value by which the start-up assisting degree is compensated on the basis of the air-fuel ratio for combustion at the start-up compensated by the air-fuel ratio for combustion-ignition timing compensating value calculator 126B, a compensating value calculator 126D for calculating the value by which the start-up assisting degree is compensated on the basis of the ignition timing at the start-up compensated by the air-fuel ratio for combustion-ignition timing compensating value calculator 126B, and a compensating value calculator 126F for calculating the value by which the start-up assisting degree is compensated on the basis of the rotational load of the internal combustion engine, so that the total amount of the values calculated by the calculators 126B-126E is added to the predetermined assisting degree by the motor in the default start-up assisting degree setting device 126A to calculate the start-up assisting degree.

Further, the start-up assisting degree may be compensated on the basis of the engine condition such as the engine stoppage time period, the engine cooling water temperature, crank stop position, rotational load or the like. The longer the engine stoppage time period is, the lower the pressure in the cylinder of the combustion chamber 5 is in comparison with that just after the stoppage of the internal combustion engine 1. The lower the pressure in the cylinder of the combustion chamber 5 is, the smaller the torque supplied by the combustion at the start-up is, when the combustion is performed just after starting the start-up.

Therefore, the longer the engine stoppage time period is, the greater the start-up assisting degree by the motor is.

The lower the engine cooling water temperature is, the greater the rotational load of the internal combustion engine 1 is. Since the internal combustion engine is restrained by the rotational load from being rotated, the torque for starting up the internal combustion engine from the stoppage needs to be great.

Therefore, when the torque generated by the combustion cannot be changed because of requirement for improving the characteristic of the exhaust gas and the rotational load is great, the start-up assisting degree by the motor is increased.

Further, when the combustion is carried out just after starting the start-up, the higher the engine temperature is, the lower a density of the air filling the combustion chamber 5 is and the smaller the torque generated by the combustion is. Therefore, the higher the engine temperature is, the greater the start-up assisting degree is.

The stop position of the crank represents an amount of air in the combustion chamber, that is, the value of the torque generated by the combustion, when the combustion is carried out just after starting the start-up.

Therefore, since the torque generated by the combustion is small when the crank is stopped at a position where the amount of air is small, the start-up assisting degree by the motor is increased. That is, the start-up assisting degree is compensated o the basis of the crank position at the stoppage of the internal combustion engine 1.

Further, since the internal combustion engine 1 is restrained by the increase of the rotational load from rotating, the torque for starting up the internal combustion engine 1 from the stoppage needs to be great. Therefore, when the torque generated by the combustion cannot be changed because of requirement for improving the characteristic of the exhaust gas and the rotational load is great, the start-up assisting degree by the motor is increased.

Further, the start-up assisting degree may be determined on the basis of the condition of the battery. For example, when the characteristic of the battery is low, since the motor generated the great value of the torque at the start-up, a voltage drop (abrupt decrease) is accelerated by the great electric current so that an equipment on the automobile is affected.

Therefore, when the characteristic of the battery is low, the start-up assisting degree may be compensated to restrain the voltage drop by lowering the torque to be generated and elongating the time period during which the torque is generated. By this compensation of the start-up assisting degree, a degree of the abrupt decrease is made small to decrease the affection on the equipment on the automobile, and a deterioration of the battery is deaccelerated.

Additionally, the start-up assisting degree may be modified in accordance of a kind of the restart requirement determined during the engine stoppage.

For example, when the restart requirement is based on a driver's action for starting the automobile such as a shift operation or the like, the automobile needs to be started immediately. That is, the characteristic of the start-up needs to be improved with improving the characteristic of the exhaust gas, in comparison with a case wherein the start requirement is based on a requirement other than starting the automobile.

Therefore, when the restart requirement is based on the driver's action for starting the automobile such as the shift operation or the like, the start-up assisting degree by the motor is increased. By increasing the start-up assisting degree, the start-up with improving the characteristic of the exhaust gas can be carried out without deterioration of the starting characteristic and drivability.

As an application of the invention, the above mentioned start-up controller for the internal combustion engine may be mounted on a diesel engine, or a gaseous fuel engine using LPG or the like as the fuel.

Hereafter, effects of the invention are mentioned briefly.

(1) Since the start-up assisting degree is determined on the basis of the condition of the exhaust gas purifier, even when the control of the internal combustion engine is changed to the reduction in the exhaust gas, both of the reduction in the exhaust gas and the start-up characteristic for the internal combustion engine not deteriorated are obtainable.

(2) The reduction in the exhaust gas can be carried out by determining the ignition timing of the internal combustion engine on the basis of the condition of the exhaust gas purifier detected by the exhaust gas purifier condition detector, and the start-up assisting degree is determined on the basis of the ignition timing, whereby both of the reduction in the exhaust gas and the start-up characteristic for the internal combustion engine not deteriorated are obtainable.

(3) Since the start-up assisting degree is determined on the basis of the condition of the exhaust gas purifier, even when the control of the internal combustion engine is changed to the reduction in the exhaust gas so that the torque generated by the combustion just after starting the start-up changes to significantly affect the characteristic of the starting up, both of the reduction in the exhaust gas and the start-up characteristic for the internal combustion engine not deteriorated are obtainable.

(4) Additionally, since the start-up assisting degree is determined on the basis of the condition of the engine such as the time period of the stoppage of the internal combustion engine, the engine cooling water temperature, the crank position at the stoppage or the like, even when the torque generated by the combustion just after starting the start-up changes, both of the reduction in the exhaust gas and the start-up characteristic for the internal combustion engine not deteriorated are obtainable.

(5) Since the start-up assisting degree is determined on the basis of the water temperature of the internal combustion engine, even when the rotational load of the internal combustion engine at the start-up changes, both of the reduction in the exhaust gas and the start-up characteristic for the internal combustion engine not deteriorated are obtainable.

(6) Since the start-up assisting degree is determined on the basis of the crank position at the stoppage of the internal combustion engine, even when the torque generated by the combustion just after starting the start-up changes, both of the reduction in the exhaust gas and the start-up characteristic for the internal combustion engine not deteriorated are obtainable.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A controller for starting up an internal combustion engine including a catalyst for purifying an exhaust gas of the internal combustion engine, and a rotational shaft capable of being rotationally driven by a combustion torque generated by a combustion in the internal combustion engine and by a motor torque generated by a motor so that the combustion is started up, comprising:

an air-fuel ratio controller for controlling an air-fuel ratio for the combustion to be supplied into the internal combustion engine so that the rotational shaft is rotationally driven by the combustion torque, an ignition timing controller for controlling an ignition timing of the combustion so that the rotational shaft is rotationally driven by the combustion torque, and a motor controller for controlling the motor torque so that the rotational shaft is rotationally driven by the motor torque, wherein the motor controller determines at least one of a value of the motor torque and a time period during which the value of the motor torque more than a predetermined motor torque value is kept to be changed in accordance with at least one of a value of the combustion torque and a torque loss in the internal combustion engine so that at lease one of that the smaller the value of the combustion torque is, the greater the at least one of the value of the motor torque and the time period is, and that the greater the torque loss is, the greater the greater the at least one of the value of the motor torque and the time period is, is satisfied, and wherein the value of the combustion torque is estimated from at least one of the air-fuel ratio for starting up the internal combustion engine, the ignition timing for starting up the internal combustion engine, a time period during which the internal combustion engine is stopped before being restarted, a rotational position of the rotational shaft of stoppage before the internal combustion engine is started up, a temperature of the internal combustion engine of stoppage before the internal combustion engine is started up, a temperature of the catalyst measured before at least one of a fuel injection and an ignition is restarted after the fuel injection and the ignition are stopped and a concentration of at least one of hydrocarbon, carbon-monoxide, oxygen and nitrogen-oxide included by the exhaust gas discharged from the catalyst before the internal combustion engine is stopped to be restarted along at lease one of a predetermined relationship between the air-fuel ratio and the combustion torque, a predetermined relationship between the ignition timing and the combustion torque, a predetermined relationship between the time period and the combustion torque, a predetermined relationship between the rotational position and the combustion torque, a predetermined relationship between the temperature of the internal combustion engine and the combustion torque, a predetermined relationship between the temperature of the catalyst and the combustion torque, a predetermined relationship between the concentration of the at least one of hydrocarbon, carbon-monoxide, oxygen and nitrogen-oxide and the combustion torque corresponding to the at least one of the air-fuel ratio, the ignition timing, the time period, the rotational position, the temperature of the internal combustion engine, the temperature of the catalyst and the concentration of the at least one of hydrocarbon, carbon-monoxide, oxygen and nitrogen-oxide.

2. The controller according to claim 1, wherein the motor controller determines the at least one of the value of the motor torque and the time period before at least one of a fuel injection and an ignition is restarted after the at least one of the fuel injection and the ignition is stopped.

3. A controller for starting up an internal combustion engine including a catalyst for purifying an exhaust gas of the internal combustion engine, and a rotational shaft capable of being rotationally driven by a combustion torque generated by a combustion in the internal combustion engine and by a motor torque generated by a motor so that the combustion is started up, comprising:

an air-fuel ratio controller for controlling an air-fuel ratio for the combustion to be supplied into the internal combustion engine so that the rotational shaft is rotationally driven by the combustion torque, an ignition timing controller for controlling an ignition timing of the combustion so that the rotational shaft is rotationally driven by the combustion torque, and a motor controller for controlling the motor torque so that the rotational shaft is rotationally driven by the motor torque, wherein the motor controller determines at least one of a value of the motor torque and a time period during which the value of the motor torque more than a predetermined motor torque value is kept to be changed in accordance with at least one of a value of the combustion torque and a torque loss in the internal combustion engine so that at lease one of that the smaller the value of the combustion torque is, the greater the at least one of the value of the motor torque and the time period is, and that the greater the torque loss is, the greater the greater the at least one of the value of the motor torque and the time period is, is satisfied, and wherein the torque loss is estimated from at least one of a temperature of the internal combustion engine of stoppage before the internal combustion engine is started up and a gradient in decreasing velocity of the rotational shaft after the fuel injection and ignition are stopped before the internal combustion engine is started up along at least one a predetermined relationship between the torque loss and the temperature of the internal combustion engine of stoppage and a predetermined relationship between the torque loss and the gradient in decreasing velocity of the rotational shaft corresponding to the at least one of the temperature of the internal combustion engine and the gradient in decreasing velocity of the rotational shaft.

4. controller according to claim 1, wherein at least one of the air-fuel ratio and ignition timing for starting up the internal combustion engine is determined from at least one of a temperature of the catalyst measured before at least one of a fuel injection and an ignition is restarted after the fuel injection and the ignition are stopped and a concentration of at least one of hydrocarbon, carbon-monoxide, oxygen and nitrogen-oxide included by the exhaust gas discharged from the catalyst before the internal combustion engine is stopped to be restarted along at least one of a predetermined relationship between the at least one of the air-fuel ratio and ignition timing for starting up the internal combustion engine and the temperature of the catalyst and a predetermined relationship between the at least one of the air-fuel ratio and ignition timing for starting up the internal combustion engine and the concentration corresponding to the at least one of the temperature of the catalyst and the concentration.

* * * * *

UNITED STATES PATENT AND TRADEMARK OFFICE
CERTIFICATE OF CORRECTION

PATENT NO. : 7,617,673 B2  Page 1 of 1
APPLICATION NO. : 11/492061
DATED : November 17, 2009
INVENTOR(S) : Udono et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 475 days.

Signed and Sealed this

Fourteenth Day of December, 2010

David J. Kappos
*Director of the United States Patent and Trademark Office*